United States Patent Office 3,380,786
Patented Apr. 30, 1968

3,380,786
BOLT CONNECTION PARTICULARLY FOR FIXING A HARROW TOOTH TO A SUPPORTING BAR
Mogens Petersen, Lynge-Eskildstrup per Soro, Denmark, assignor to Kongskilde Maskinfabrik A/S, Soro, Denmark
Filed Aug. 10, 1966, Ser. No. 571,536
Claims priority, application Denmark, Aug. 20, 1965, 4,271/65
2 Claims. (Cl. 306—1.5)

ABSTRACT OF THE DISCLOSURE

The present disclosure relates to a bolt and washer plate combination for holding a bar of a harrow tooth to a supporting bar the two bars being at right angles. The washer plate has the shape of a 7 having an aperture through each leg. The harrow tooth bar passes through one of the apertures and is itself provided with an aperture, a bolt having an eccentric cam passing through the other aperture of the washer plate and then through the aperture in the harrow tooth bar. The supporting bar is trapped on four sides between the two legs of the washer plate, the bolt, and the harrow tooth bar. The leg of the washer plate through which the bolt passes is provided with a contact portion against which the support bar is forced and the remainder of that leg serves as a spring forcing contact between the contact portion and the support bar.

---

The present invention relates to a bolt connection having a washer plate and a bolt for clamping together two bar-shaped mutually crossing units, particularly for fixing a harrow tooth to a supporting bar, and where the bolt extends through holes in the washer plate and in one of the two units at a slight distance from the edge of the other unit.

It is known to provide the bolt with a sectionally circular part serving as guiding engagement in at least one of the holds, and on the area between the holes to provide a part eccentrically situated in relation to the guiding part and which, by turning, can be brought to bear against the said other unit.

The object of the present invention is to provide such a bolt connection in which the mutual position of the two units is additionally secured.

This is achieved by the present invention which is characterized in that the washer plate has the general shape of a figure seven, which bears against the other unit only in the middle portion and in the portion distally situated from the bolt. This result in the mutual position of the two units being additionally secured as a spring effect of the washer plate is achieved.

According to the invention the washer plate can be provided with a part in which the hole for the bolt is placed and which forms an acute angle with the surface of the other unit, which part passes into a bent part carrying the flange which bears against the front edge of the unit. Thereby a spring effect at both ends of the washer plate is achieved. In this embodiment of the invention the midmost portion of the washer plate has roughly the shape of a flat S. However, the midmost portion may be given shapes deviating from the described, provided that the desired spring effect is achieved, it being understood that changes in the precise embodiments of the invention herein disclosed may be made within the scope of what is claimed without departing from the spirit of the invention.

Figure 1:
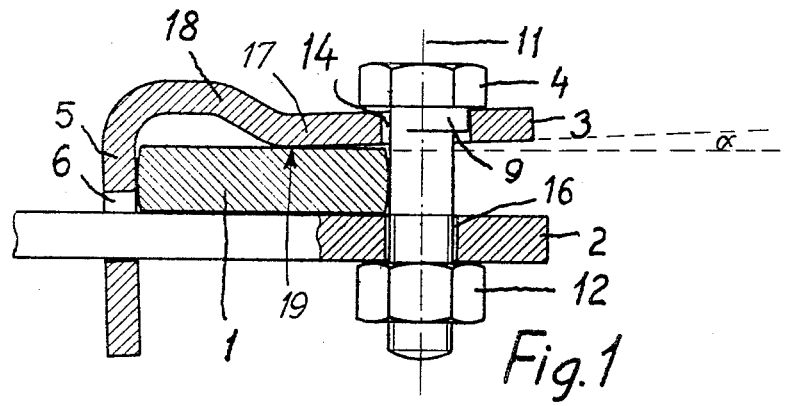
Figure 2:
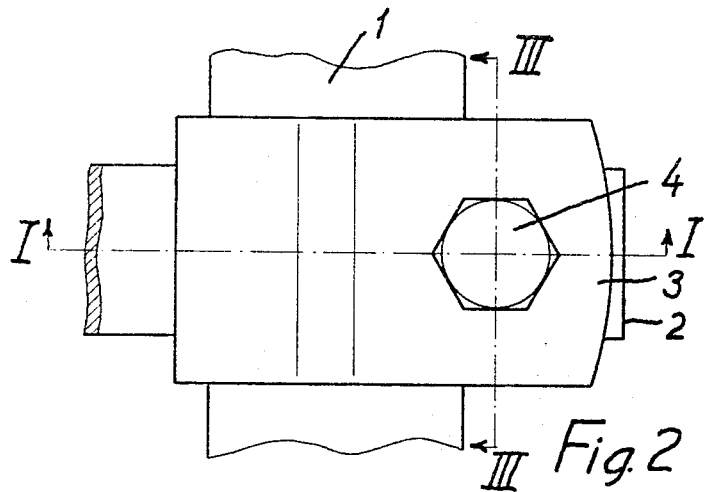
Figure 3:
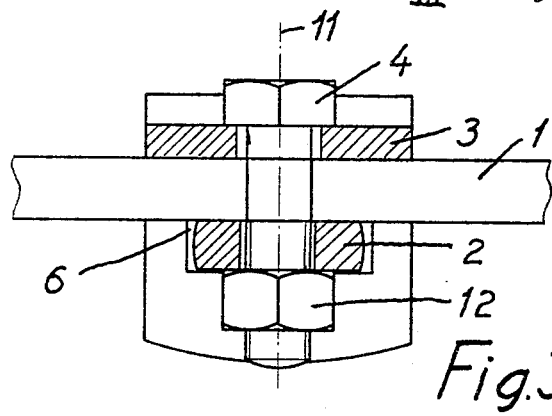

Other objects and advantages will become apparent from the following description taken in conjunction with the accompanying drawing in which:

FIG. 1 shows a section through the bolt connection according to the invention following the line I—I in FIG. 2, seen in the direction of the arrows,
FIG. 2 the same seen from above, and
FIG. 3 a section along the line III—III in FIG. 2, seen in the direction of the arrows.

In the figures 1 designates a supporting bar. 2 is a unit, for example a harrow tooth which is to be fixed to the carrying unit 1. This fixing is effected by means of a washer plate 3 and a bolt 4 which immediately beneath its head has a sectionally guiding cam part 9 which is formed integral with the bolt itself, and which fits into a bolt hole 14 formed in the washer plate 3. An axis through the bolt 4 is marked 11, and as it appears from the drawing, the bolt 4 by turning can be brought to clamp the flange 5 of the washer plate 3 against the supporting bar 1. This is effected by tightening the nut marked 12 up loosely first, after which the entire bolt 4 is turned until a suitable pressure is exerted against the edge of the supporting bar 1, whereupon the nut 12 is finally screwed home. In the flange 5 there is a hole 6 through which the unit 2 is carried. In the unit 2 there is a further hole 16 for the bolt shank.

The washer plate 3 is provided with a part 17 in which the hole 14 for the bolt 4 is situated and which forms an acute angle alpha to the surface of the supporting bar 1 which part 17 extends into a bent part 18 which carries the flange 5 approximately normal to the former part 17. The flange 5 bears against the edge of the supporting bar 1. By tightening the nut 12 the washer plate has a spring effect since, up to a point, it can yield and spring about the line 19 where it bears against the supporting bar 1. The unit 2 is positioned resiliently both by the bolt 4 and by the flange 5. In this manner the connection between the supporting bar 1 and the unit 2, which notably in harrows and similar implements is exposed to heavy impacts, become securer.

The embodiments of the invention in which an exclusive property or privilege is claimed are defined as follows:

1. A bolt connection, particularly for fixing a harrow tooth to a supporting bar, comprising:
   a generally 7-shaped washer plate for associating together first and second bar-shaped, mutually crossing units,
   said washer plate having a first bolt receiving aperture therethrough on the first leg of the 7 shape thereof, a second aperture therethrough on the second leg thereof receiving the second bar,
   said first leg comprising at least two angularly related parts providing a contact portion at their juncture with said contact portion being spaced between said first aperture and said second leg, said first leg being generally spring-like adjacent said contact point as a result of said angularity,
   a bolt extending through said first aperture and through a hole in the second bar,
   said bolt having a cam surface integral with the shaft thereof which cam lies within said first aperture,
   the distance between the inner surface of the second leg of said washer plate and said bolt being so proportioned to the width of the first bar such that the first bar fits therebetween and is clamped therebetween upon rotation of said bolt cam surface within said first aperture,
   said washer plate upon rotation of said bolt bearing against the first bar along the inner surface of said second leg and along only said contact portion of said first leg.
2. A bolt connection in accordance with claim 1 wherein said first leg comprises a first part and a second part, said first part being provided with said first aperture and forming an acute angle with the plane of the first bar, said second part lying between said first part and said second leg and being generally arcuately bent so as to be entirely out of contact with said first bar, said contact portion of said first leg being in contact with said first bar lying generally between said first and second parts.

References Cited

UNITED STATES PATENTS

| | | | |
|---|---|---|---|
| 217,363 | 7/1879 | Gaunt | 306—1.5 |
| 232,641 | 9/1880 | Harris | 306—1.5 |
| 2,424,185 | 7/1947 | Morkoski | 306—1.5 |
| 2,886,270 | 5/1959 | Wendela | 24—132 |

FOREIGN PATENTS

| | | |
|---|---|---|
| 187,107 | 6/1907 | Germany. |
| 256,934 | 2/1913 | Germany. |

EDWARD C. ALLEN, *Primary Examiner.*

ANDREW V. KUNDRAT, *Assistant Examiner.*